United States Patent
Lopez et al.

(12)

(10) Patent No.: US 9,865,000 B1
(45) Date of Patent: Jan. 9, 2018

(54) MERCHANT SERVICES FOR SERVICE PROVIDER CATALOG ITEMS

(71) Applicant: Amazon Technologies, Inc., Reno, NV (US)

(72) Inventors: Gustavo Eduardo Lopez, Seattle, WA (US); Michael Martin George, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 661 days.

(21) Appl. No.: 13/786,005

(22) Filed: Mar. 5, 2013

(51) Int. Cl.
*G06Q 10/00* (2012.01)
*G06Q 30/02* (2012.01)

(52) U.S. Cl.
CPC ............... *G06Q 30/0201* (2013.01)

(58) Field of Classification Search
CPC ......... G06Q 10/00; G06Q 30/02; G06Q 10/06
USPC ................................................ 705/7.11–7.42
See application file for complete search history.

(56) References Cited

U.S. PATENT DOCUMENTS

| 6,269,343 | B1 | 7/2001 | Pallakoff | |
| 6,754,636 | B1* | 6/2004 | Walker | G06Q 20/00 705/14.26 |
| 7,668,747 | B2 | 2/2010 | Murphy et al. | |
| 7,672,897 | B2 | 3/2010 | Chung et al. | |
| 8,655,737 | B1* | 2/2014 | Tromble | G06Q 30/00 705/1.1 |
| 2011/0191150 | A1* | 8/2011 | Blackhurst | G06Q 30/0207 705/14.1 |
| 2012/0095828 | A1* | 4/2012 | Evankovich | G06Q 10/00 705/14.49 |

* cited by examiner

*Primary Examiner* — Robert D Rines
(74) *Attorney, Agent, or Firm* — Lee & Hayes, PLLC

(57) ABSTRACT

A service provider may obtain information about a plurality of items offered for acquisition by a merchant. The service provider may identify one or more items of the plurality of items that are the same as one or more respective items included in a catalog of items associated with the service provider. The items included in the catalog of items may be available for acquisition via the service provider. Additionally, the service provider may communicate with the merchant to offer services in relation to the items included in the service provider catalog of items that match the items offered by the merchant.

8 Claims, 8 Drawing Sheets

MERCHANT SERVICES FOR SERVICE PROVIDER CATALOG ITEMS

BACKGROUND

In some cases, a merchant may offer items, such as products or services, in their inventory for acquisition via a site of the merchant, such as a website. In other situations, a merchant may advertise items available for acquisition in a physical store of the merchant via a third-party site, such as a merchant directory website or a social networking site However, the exposure of items being offered for acquisition by a local merchant are typically limited.

Additionally, service providers are often looking for ways to provide services for a larger pool of merchants. For example, deal sites and ecommerce service providers may seek to increase the number of merchants that are obtaining their services. In many situations, the number of options for reaching out to merchants to provide information about the services offered by the service providers is limited and the effectiveness of some of these options can be inadequate.

BRIEF DESCRIPTION OF THE DRAWINGS

The detailed description is set forth with reference to the accompanying figures, in which the left-most digit of a reference number identifies the figure in which the reference number first appears. The use of the same reference numbers in the same or different figures indicates similar or identical items or features.

DETAILED DESCRIPTION

Figure 1:
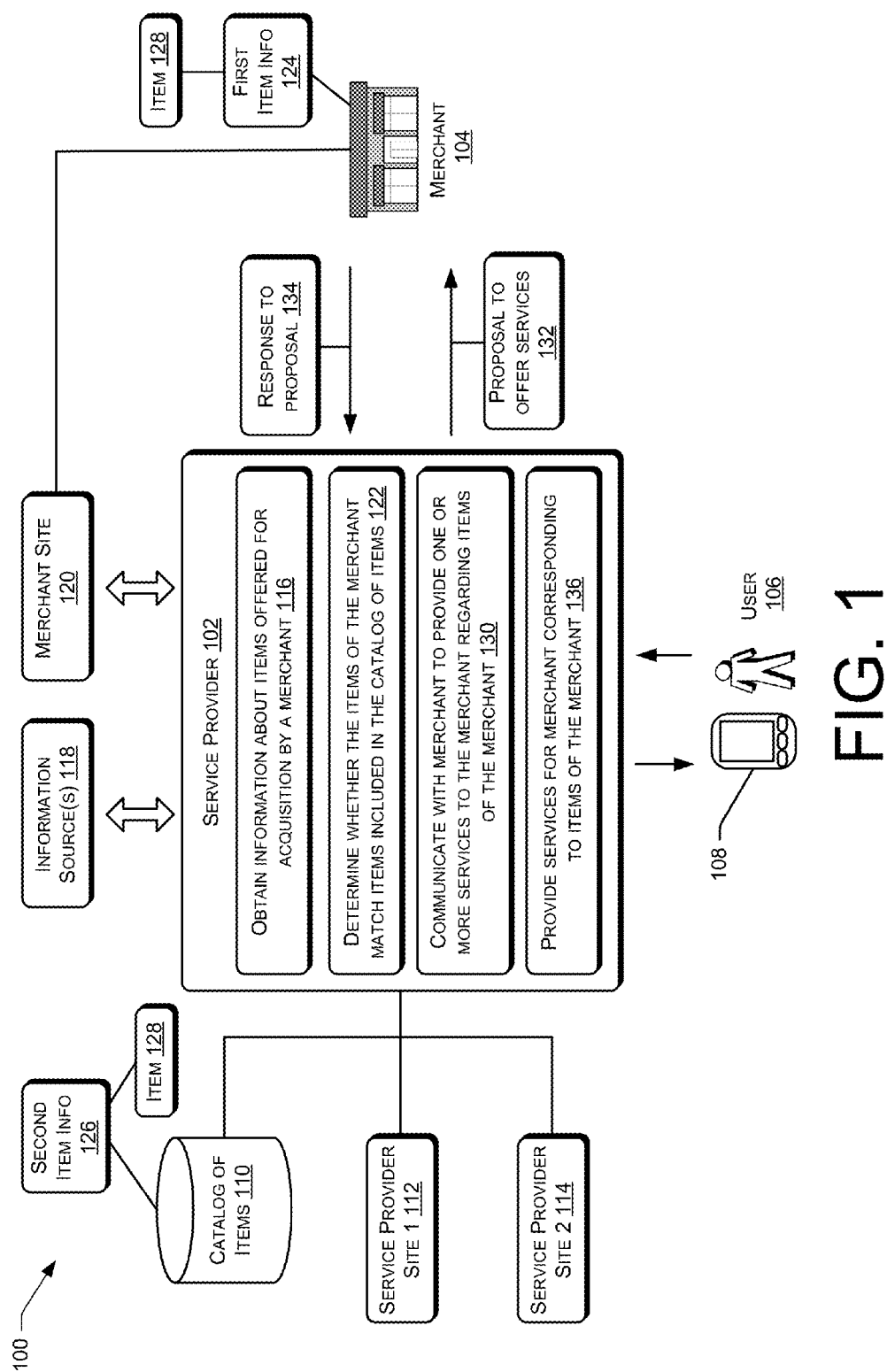
FIG. 1 is a diagram illustrating an example environment to provide services to a merchant for items included in a service provider catalog.

This disclosure describes systems and processes to provide services to a merchant for items offered for acquisition in a catalog of the service provider. Additionally, the systems and processes described herein may add merchants to the pool of merchants obtaining services from the service provider in an automated or partially automated manner. Thus, the service provider may decrease the amount of time and effort to add merchants to a customer base of the service provider. Furthermore, the convenience of obtaining services from the service provider in an automated or partially automated manner may expand the number of merchants receiving information about the services offered by the service provider and increase the number of merchants choosing to obtain services offered by the service provider, due to the convenience of obtaining the services of the service provider according to these systems and processes. In particular, since the service provider has already obtained information about items offered for acquisition by the merchants, the amount of time and resources expended by the merchants to provide information to the service provider in association with obtaining services from the service provider is minimized. For example, a merchant does not have to take time to gather information about items offered for acquisition by the merchant and then communicate this information to the service provider. When a merchant chooses to obtain services from the service provider, the exposure of items offered for acquisition by the merchant may increase. Accordingly, the number of acquisitions related to the items may also increase along with the revenue associated with the increased number of acquisitions.

In particular, the service provider may obtain information from a number of sources regarding items offered for acquisition by merchants. In an implementation, the service provider may utilize one or more applications to collect information from sites that include information about items that merchants are offering for acquisition. In some cases, the sites may be associated directly with the merchants. In other cases, the sites may be third-party sites, such as a business directory site, a social media site, a deals site, an ecommerce site, or a combination thereof. In another implementation, the service provider may obtain information about merchants in a manual manner. For example, employees of the service provider may obtain physical copies of listings of items offered for acquisition by a merchant, such as a menu or a paper catalog, and/or engage in conversations with individuals familiar with the items offered by the merchant.

After obtaining information about items offered for acquisition by merchants, the service provider may determine whether information associated with any of the items offered by the merchants matches information included in a catalog of items offered for acquisition via the service provider. In an implementation, the service provider may compare information obtained about items offered by the merchants with information associated with items in the catalog of the service provider to determine if one or more of the items are the same. The service provider may invoke a number of rules to identify items offered by the merchants that are the same as items offered in the catalog of the service provider. In one example, the service provider may specify that a match has occurred when particular item information associated with a merchant and information associated with an item of the service provider are the same, such as a universal product code (UPC). In another example, the service provider may specify that a match has occurred when a threshold amount of item information associated with a merchant is the same or substantially the same as information of an item offered via the service provider.

When one or more items offered for acquisition by a merchant match corresponding items in a catalog of the service provider, the service provider may communicate with the merchant regarding services that the service provider can offer to the merchant regarding the items. In some cases, the service provider may send an email, a text message (e.g. Short Message Service (SMS) message), a notification via an application associated with a merchant device, an automated phone call, or a combination thereof to the merchant. In other cases, a representative of the service provider may communicate with the merchant via a telephone conversation, an in-person visit, or both.

The communication between the service provider and the merchant may indicate particular services that the service provider can offer with respect to the one or more matching items. For example, the service provider may offer to provide a page on a site of the service provider that includes information about a particular item offered by the merchant. In one implementation, the information associated with the particular item that is included in the page provided by the service provider may be more than the information about the particular item obtained from the information sources. In another example, the service provider may offer to administer a deal regarding a particular item and provide terms of the deal in the communication. In particular implementations, the merchant may provide an indication to obtain services offered by the service provider. Since the service provider already has information about the one or more items being offered in association with the services, the services may be provided by the service provider with a minimum amount of time and resources. By offering services to merchants regarding items being offered for acquisition by both the service provider and the merchants, the information about the items that is already maintained by the service provider can be leveraged to offer services to the merchants with a minimal expenditure of time and resources on the part of the service provider.

This brief introduction, including section titles and corresponding summaries, is provided for the reader's convenience and is not intended to limit the scope of the claims, nor the proceeding sections. Furthermore, the techniques described above and below may be implemented in a number of ways and in a number of contexts. Several example implementations and contexts are provided with reference to the following figures, as described below in more detail. However, the following implementations and contexts are but a few of many.

Example Environment

FIG. 1 is a diagram illustrating an example environment 100 to provide services to a merchant for items included in a service provider catalog. The environment 100 includes a service provider 102 and one or more merchants, such as merchant 104. The environment 100 also includes a user 106 that may communicate with the service provider 102 via user device 108. The service provider 102 and the merchant 104 may each offer a number of items for acquisition. In some cases, the service provider 102 and the merchant 104 offer some of the same items for acquisition. As used herein, items may include tangible items, intangible items, products, goods, services, a bundle of items, digital goods, digital services, combinations thereof, and the like. In one implementation, the user 106 may acquire one or more items from the service provider 102, the merchant 104, or both. The acquisition of items by the user 106 may be achieved through various means of providing value for the items, such as purchasing items, renting items, borrowing items, trading items, bartering items, combinations thereof, and the like.

In a particular implementation, the service provider 102 may offer items for acquisition included in a catalog of items 110. The catalog of items 110 may include information about items offered for acquisition by the service provider 102, such as one or more prices for each item, reviews of items, ratings of items, images of items, descriptions of items (e.g., dimensions, features, etc.), identifiers of the items, inventory information associated with the items, or combinations thereof. In some cases, each item included in the catalog of items 110 is associated with a unique identifier assigned by the service provider 102. The unique identifier assigned by the service provider 102 may be in addition to an identifier associated with a manufacturer or distributor of an item, such as a UPC code.

In some cases, the service provider 102 may be a merchant that is offering particular items for acquisition. In other cases, the items being offered for acquisition via the service provider 102 are offered on behalf of one or more additional merchants. In a particular implementation, merchants may compete to be a merchant that provides items for acquisition via the service provider 102. In an illustrative, non-limiting implementation, an item included in the catalog of items 110 may be offered for acquisition by the service provider 102 on behalf of a single merchant. In some situations, the service provider 102 may implement a number of rules to ensure that multiple listings are not included in the catalog for the same item.

Items included in the catalog of items 110 may be offered for acquisition via a first service provider site 112 and a second service provider site 114. In one implementation, the first service provider site 112 and the second service provider site 114 may offer different types of items included in the catalog of items 110. For example, the first service provider site 112 may offer items associated with electronics devices and electronic media, while the second service provider site 114 may offer items associated with clothing articles. In another implementation, the first service provider site 112 and the second service provider site 114 may offer items to users located in different geographic regions. In one example, the first service provider site 112 may be dedicated to offering items for acquisition to users located in the California, while the second service provider site 114 may be dedicated to offering items for acquisition to users located in New York State. In another example, the first service provide site 112 may be a national site that offers items for acquisition to users located in a particular country, while the second service provider site 114 may be a local site that offers items for acquisition to users located in a particular metropolitan area, such as the Seattle metropolitan area. In a non-limiting, illustrative implementation, when the second service provider site 114 is a local site, the second service provider site 114 may offer items for acquisition on behalf of local merchants.

At least a portion of the services offered by the service provider 102 are services that may be obtained by the merchant 104. For example, the service provider 102 may provide transaction services such that items offered by the merchant 104 can be acquired via a merchant site 106 or via a site of the service provider 102, such as the first service provider site 108 and the second service provide site 110. In another example, the service provider 102 may administer deals with respect to items offered by the merchant 104. The service provider 102 may also offer fulfillment services for items offered by the merchant 104, such as delivery to a particular location specified by a user acquiring an item from the merchant 104 or facilitating an in-store pickup of items acquired by a user at a location of the merchant 104. The service provider 102 may also offer search results services to the merchant 104, such that an item offered by the merchant 104 may be returned more often and/or featured more prominently in response to a search request having particular criteria.

In an illustrative implementation, at 116, the service provider 102 may obtain information about items offered for acquisition by the merchant 104. For example, the service provider 102 may obtain information about the items from one or more information sources 118. In some cases, the one or more information sources 118 may include a site 120 of the merchant 104. The one or more information sources 118 may also include additional sites, such as merchant directory sites, reviews sites, ecommerce sites, social networking sites, micro-blogging sites, a combination thereof, and the like. In particular instances, the service provider 102 may implement one or more algorithms to scrape sites to obtain information about merchants. Scraping a site may include extracting information from a site. For example, scraping a site may include obtaining and analyzing code associated with a page of a site. In some cases, the information from the site may be filtered to obtain particular information from the site. In this way, the service provider 102 may obtain information about items offered for acquisition by the merchant 104 on behalf of the merchant with minimal effort from the merchant 104.

Additionally, the one or more information sources 118 may include physical documents, such as menus, catalogs, advertisements, etc. When the information sources 118 include physical documents, the information included in the physical documents may be converted to into a machine-readable form before being stored by the service provider 102. In some cases, one or more filtering algorithms may be applied to the scanned documents to identify particular information corresponding to items being offered for acquisition by merchants, such as a UPC, a price, a description, an image, and the like. In other implementations, the information from the physical documents may be entered into a database of the service provider 102 manually, such as data entry via a user interface.

In some instances, when information about items offered by merchants is obtained from individuals, this information may be manually entered into a database of the service provider 102 via a suitable user interface. For example, employees of the service provider 102 may obtain information about items offered for acquisition by merchants from conversations with representatives of the merchants, conversations with customers of the merchants, conversations with third-parties, or a combination thereof. During or after these conversations, relevant information included in the conversations regarding items offered for acquisition by merchants may be entered into a database of the service provider 102 by the employees of the service provider 102 via the user interface. In an additional implementation, the conversations including information about items offered for acquisition by merchants may be recorded and the service provider 102 may utilize one or more speech recognition algorithms to convert the speech to text. A number of filtering techniques may then be applied to the text of the conversations to extract information relating to items offered for acquisition by merchants.

At 122, the service provider 102 may determine whether first item information 124 offered for acquisition by the merchant 104 matches second item information 126 included in the catalog of items 110. The first item information 124 may include a portion of the information obtained about items offered for acquisition by the merchant 104 from the information sources 118, and the second item information 126 may include a portion of information included in the catalog of items 110. In a particular implementation, the service provider 102 may compare the first item information 124 with the second item information 126. In one implementation, when specified portions of the first item information 124 correspond with the second item information 126, the service provider 102 may determine that both the first item information 124 and the second item information 126 are associated with the same item 128. For example, when a UPC included in the first item information 124 matches a UPC included in the second item information 126, the service provider 102 may determine that the first item information 124 and the second item information 126 correspond to the same item 128. In another implementation, when a threshold amount of information included in the first item information 124 corresponds to information included in the second item information 126, the service provider 102 may determine that the service provider 102 and the merchant 104 are offering units of the same item 128 for acquisition. To illustrate, when an image included in the first item information 124 corresponds to an image included in the second item information 126 and a portion of an item description included in the first item information 124 corresponds to a portion of an item description included in the second item information 126, the service provider 102 may determine that the service provider 102 and the merchant 104 are offering units of the same item 128 for acquisition.

At 130, the service provider 102 may communicate with the merchant 104 to provide one or more services to the merchant 104 regarding one or more items offered for acquisition by the merchant 104. For example, the service provider 102 may send a communication, such as an email or a text message, including a proposal 132 to the merchant 104 to offer services in relation to items offered for acquisition by the merchant 104 that match items included in the catalog of items 110. In another example, a representative of the service provider 102 may contact the merchant 104 regarding the proposal 132 in person or via a telephone call.

In one implementation, the proposal 132 may indicate that the merchant 104 can offer the item 128 for acquisition via the first service provider site 112, the second service provider site 114, or both. In another implementation, the proposal 132 may indicate that the service provider 102 can administer a deal for the merchant 102 in relation to the item 128. In a further implementation, the proposal 132 may indicate that the service provider 102 can increase the exposure of the item 128 on the first service provider site 112, the second service provider site 114, or both by providing enhanced search results services with respect to the item 128. The enhanced search results services may more frequently return a result associated with the merchant 104 offering the item 128 for acquisition in response to a search for items associated with certain criteria and/or the enhanced search results services may specify that a result associated with the merchant 104 offering the item 128 for acquisition will appear in a higher position of a ranked list of search results that are provided in response to a search for items associated with specified criteria.

The communication between the service provider 102 and the merchant 104, at 130, may also include the service provider 102 receiving a response 134 from the merchant 104 regarding the proposal 132. The response 134 may indicate an acceptance of the proposal 132, a rejection of the proposal 132, or a modification of the proposal 132. In one situation, the merchant 104 may modify the proposal 132 by suggesting alternative terms of a deal being proposed by the service provider 102 or offering the item 128 for acquisition via the second service provider site 114 at an alternative price. In some cases, the service provider 102 may receive an electronic version of the response 134, such as an email or text message, while in other instances the service provider 102 may receive the response 134 via a telephone call or an in-person visit from a representative of the merchant 104.

At 136, the service provider 102 may provide services to the merchant 104 corresponding to items offered for acquisition by the merchant 104. For example, the service provider 102 may provide the item 128 for acquisition via the first service provider site 112, the second service provider site 114, or both. In a particular implementation, second service provider site 114 may correspond to a site that provides items for acquisition to individuals located in the same geographic region as the merchant 104 and the service provider 102 may provide the item 128 for acquisition via the second service provider site 114. In another example, the service provider 102 may offer a deal with respect to the item 128. In a further example, the service provider 102 may provide enhanced search results services for the merchant with respect to the item 128. To illustrate, the user 106 may submit a search request to the service provider 102 for items matching one or more criteria. In responding to the search request, the service provider 102 may identify one or more merchants offering items matching the one or more criteria. In a particular situation, the item 128 may match the one or more criteria of the search request. When providing a response to the user corresponding to the search results, the service provider 102 may emphasize a result associated with the merchant 104 offering the item 128 with respect to other search results.

Example Content Server

Figure 2:
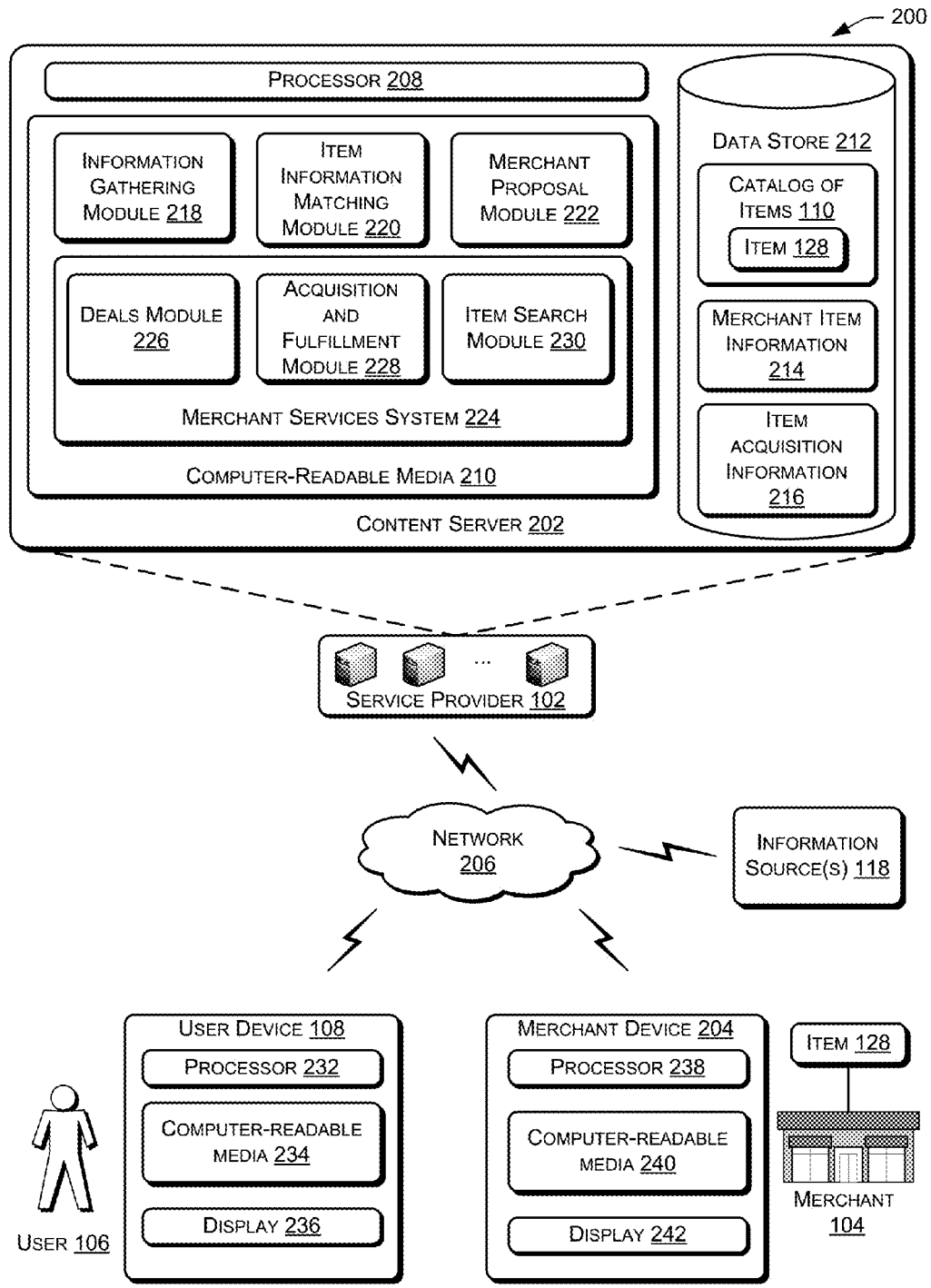
FIG. 2 is a diagram illustrating an example content server, user device, and merchant device that are part of a system that provides services to merchants in relation to items offered for acquisition in a catalog of a service provider.

FIG. 2 is a diagram illustrating an example system 200 including a content server 202, a user device 128, a merchant device 204, and a service provider 102 that provides services to merchants in relation to items offered for acquisition by the merchants and in a catalog of the service provider 102. In an embodiment, the content server 202 may include a single server, a cluster of servers, a server farm or data center, and so forth, although other server architectures (e.g., a mainframe architecture, a cloud computing architecture, etc.) may also be used. The user device 108 operated by the user 106. The user device 108 may include a laptop computer, a desktop computer, a smart phone, an electronic reader device, a mobile handset, a personal digital assistant (PDA), a portable navigation device, a portable gaming device, a tablet computer, a watch, a portable media player, another client device, and the like. In some situations, the user 106 may acquire items via the service provider 102, such as a site of the service provider 102. Additionally, the merchant device 204 may include a computing device (e.g., laptop computer, desktop computer, smart phone, tablet computer, etc.), a server computer, a point-of-sale device, combinations thereof, and so forth. In some cases, the merchant device 204 may be operated by a representative of the merchant 104 to communicate with the service provider 102 in relation to offering items of the merchant 104 for acquisition via the service provider 102.

In addition, the system 200 includes one or more information sources 118 that include information about merchants, such as information about items offered for acquisition by the merchants. In some cases, the information sources 118 may include one or more merchant sites, such as the merchant site 120 of the merchant 104, one or more merchant directory sites, one or more deal sites, one or more ecommerce sites, one or more social networking sites, one or more micro-blogging sites, a combination thereof, and the like. In other cases, the information sources 118 may include physical documents, such as menus, advertisements, periodicals, catalogs, a combination thereof, and so forth.

The content server 202, the user device 108, the merchant device 204, at least a portion of the information sources 118, or combinations thereof, may communicate via a network 206. The network 206 may include any one or combination of multiple different types of wired and wireless networks, such as the Internet, cable networks, satellite networks, wide area wireless communication networks, wired local area networks, wireless local area networks, and public switched telephone networks (PSTN).

The content server 202 includes one or more processors represented by processor 208. In some situations, the processor 208 may include a central processing unit (CPU), a graphics processing unit (GPU), or both a CPU and GPU, or other processing units. Additionally, the processor 208 may include a local memory that may store program modules, program data, and/or one or more operating systems.

The content server 204 also includes computer-readable media 210 that is accessible by the processor 208. The computer-readable media 210 is an example of computer readable storage media and may include volatile memory, nonvolatile memory, removable memory, non-removable memory, or a combination thereof. For example, the computer-readable media 210 may include, but is not limited to, RAM, ROM, EEPROM, flash memory, one or more hard disks, solid state drives, optical memory (e.g. CD, DVD), or other non-transient memory technologies. The computer-readable media 210 may store a number of modules including computer-readable instructions executable by the processor 208 to offer items of merchants for acquisition.

The content server 202 also includes, or is coupled to, a data store 212 that may include, but is not limited to, RAM, ROM, EEPROM, flash memory, one or more hard disks, solid state drives, optical memory (e.g. CD, DVD), or other non-transient memory technologies. The data store 212 stores a catalog of items 110 that includes information about items, such as the item 128, offered for acquisition via the service provider 102. In some cases, the items may be offered on behalf of a particular merchant, such as the merchant 104. In other cases, the items included in the catalog of items 110 may be offered on behalf of the service provider 102, such as when the service provider 102 is acting as a merchant. In one implementation, the information included in the catalog of items 110 may include prices of items, images of items, descriptions of items, features of items, ratings of items, reviews of items, titles of items, identifiers of items, combinations thereof, and so forth.

The data store 212 also stores merchant item information 214 that includes information obtained from the information sources 106 about items offered for acquisition by one or more merchants. In an implementation, the merchant item information 214 may include prices of items offered by merchants, descriptions of items offered by merchants, features of items offered by merchants, images of items offered by merchants, titles of items offered by merchants, identifiers of items offered by merchants, discounts offered in association with items offered by merchants, combinations thereof, and so on.

Further, the data store 212 stores item acquisition information 216 that includes information corresponding to acquisitions of items via the service provider 102. For example, the item acquisition information 216 may include item acquisition history of individuals, preferences of individuals, item search/browse history of individuals, deal browse/search history of individuals, financial transaction information for acquisitions of items and/or deals by individuals, location of individuals (e.g. current location, predicted location, user specified location, etc.), reputation of individuals, combinations thereof, and the like. In some cases, the item acquisition information 216 may include data from accounts of individuals with the service provider 202 (e.g. profile information, payment instrument information, deals currently in effect, etc.).

In the illustrative implementation of FIG. 2, the computer-readable media 210 includes an information gathering module 218 that is executable by the one or more processors 208 to obtain information about items offered for acquisition by merchants and store the information in the data store 212 as part of the merchant item information 214. In some situations, the information gathering module 218 may obtain information about items offered for acquisition by merchants from the information sources 118. In addition, the information gathering module 218 may obtain information about items offered for acquisition by merchants on behalf of the merchants. For example, the merchant 104 may request that the service provider 102 obtain information about items offered for acquisition by the merchant 104. In another example, the information gathering module 218 may obtain information about items offered for acquisition by the merchant 104 without receiving a request from the merchant 104.

In one implementation, the information gathering module 218 may scrape sites to obtain information about items offered for acquisition by merchants. In another implementation, the information gathering module 218 may provide one or more user interfaces to receive information regarding items offered for acquisition by merchants. For example, representatives of the service provider 102 may have conversations with individuals, such as representatives of merchants, customers of merchants, etc., to gather information about items offered for acquisition by merchants. In these situations, the representatives of the service provider 102 may enter the information obtained about the merchant items in these conversations via the user interfaces. Representatives of the service provider 102 may also enter information about items offered by merchants via the user interfaces provided by the information gathering module 218 that the representatives read from a physical document, viewed on a television screen or computer display device, heard on the radio, or a combination thereof. Further, the information gathering module 218 may provide user interfaces for customers of the service provider 102 to enter information regarding items offered for acquisition by merchants.

In other implementations, the information gathering module 218 may receive information from an optical scanner, audio output device, or both associated with items offered for acquisition by merchants. To illustrate, physical documents including information about items offered by merchants may be scanned by representatives of the service provider 102. The information from the scanned documents may be subjected to an optical character recognition process and one or more filtering algorithms to extract particular information associated with items offered by merchants, such as prices of the items, identifiers of the items, descriptions of the items, and so forth. Additionally, conversations and/or audio advertisements may be analyzed by a speech recognition program and one or more filtering algorithms to extract information related to items offered for acquisition by merchants.

The computer-readable media 210 also includes an item information matching module 220 that is executable by the one or more processors 208 to identify items offered for acquisition by merchants that are also stored in the catalog of items 110. In some cases, the item information matching module 220 may compare information about items offered for acquisition by merchants stored in the merchant item information 214 with information stored in the catalog of items 110. In one implementation, when specified item information stored in the merchant item information 214 matches specified item information stored in the catalog of items 110, the item information matching module 220 may determine that a merchant and the service provider 102 are offering units of the same item for acquisition. For example, the item information matching module 220 may determine that both the merchant 104 and the service provider 102 are offering units of the item 128 for acquisition when a UPC included in item information of the merchant 104 matches a UPC in the catalog of items 110.

In another implementation, the item information matching module 220 may determine that a merchant is offering units of an item for acquisition that is also included in the catalog of items 110 based at least partly on a threshold amount of item information included in the catalog of items 110 being the same as item information included in the merchant item information 214. To illustrate, when a threshold number of words included in an item description in the merchant item information 214 match a corresponding number of words included in an item description included in the catalog of items 110, the item information matching module 220 may determine that the item descriptions are associated with the same item and that the service provider 102 and the merchant are offering units of the same item for acquisition. In another illustration, the item information matching module 220 may determine that item information associated with a merchant and item information included in the catalog of items 110 corresponds to the same item when a threshold amount of an image included in the merchant item information 214 matches a corresponding amount of an image included in the catalog of items 110.

In some implementations, the item information matching module 220 may send a communication to a merchant requesting more information to determine whether the merchant and the service provider 102 are offering units of the same item for acquisition. For example, when particular information is not found for an item offered by a merchant in the catalog of items 110, such as a UPC code, or a threshold amount of information associated with an item offered by a merchant is not found that matches information in the catalog of items 110, the service provider 102 may communicate with the merchant to provide the missing information to determine whether the merchant and the service provide 102 are offering the same item for acquisition.

Additionally, in some scenarios, when information about an item offered by a merchant does not match information in the catalog of items 110, the item information matching module 220 may provide the merchant with an option to add the item to the catalog of items 110. In one implementation, the service provider 102 may request additional information from the merchant to add the item to the catalog of items 110. For example, the service provider 102 may request that the merchant provide an image of the item, a price of the item, a description of the item, a UPC of the item, a title of the item, a combination thereof, and the like before adding the item to the catalog of items 110. In this situation, the item information matching module 220 may provide a user interface for the merchant to enter the information requested by the service provider 102.

In a particular implementation, the item information matching module 220 may also determine whether a merchant is offering a deal that corresponds to an item included in the catalog of items 110. For example, after determining that the merchant and the service provider 102 are offering the same item for acquisition, the item information matching module 220 may determine whether the merchant information associated with the item includes a discounted price and a duration relating to the discounted price.

The computer-readable media 220 also stores a merchant proposal module 222 to communicate with merchants regarding proposals to provide services offered by the service provider 102. In one implementation, when the item information matching module 220 determines that a merchant and the service provider 102 are offering units of the same item for acquisition, the merchant proposal module 222 may send a communication to the merchant regarding services offered by the service provider 102 in relation to the item. In one example, the service provider 102 may offer to administer a deal for the merchant in relation to the item. In some cases, the merchant may already be offering the deal, but the service provider 102 may offer to distribute information about the deal via a site of the service provider 102. In another example, the service provider 102 may offer to provide acquisition and fulfillment services for the merchant. In an additional example, the service provider 102 may offer to provide item search related services to the merchant, such as enhanced search results services.

In an illustrative implementation, the communication sent to a merchant regarding services being offered by the services provider 102 may include links to access previews of the services being offered by the service provider 102. For example, the communication may provide a link to access a page of the service provider 102 that includes information about a deal associated with items offered by the merchant. In some cases, the terms of the deal may be provided by the service provider 102, while in other cases, the terms of the deal may be set by the merchant. Additionally, the communication may provide a link to access a page of the service provider 102 where items of the merchant may be acquired such that the financial transactions that take place to acquire the items are conducted through the service provider 102.

In an implementation, when the item information matching module 220 identifies a number of items that both a merchant and the service provider 102 are offering for acquisition, the communication provided to the merchant regarding services offered by the service provider 102 with respect to the matching items may include recommendations to obtain services from the service provider 102 for particular items. For example, acquisition data for the matching items may be utilized by the service provider 102 to provide the recommendations. To illustrate, the service provider 102 may recommend obtaining services in relation to items having a particular frequency of acquisition, items having high ratings, items associated with a specified number of positive reviews, or a combination thereof. In particular situations, the recommendations may be based at least partly on acquisition data corresponding to the geographic region where the merchant is located.

After providing a communication to the merchant regarding the proposal to offer services for the merchant, the merchant proposal module 222 may receive a response from the merchant. In some cases, the merchant may indicate no interest in receiving services from the service provider 102. In other situations, the merchant may agree to receive services from the service provider 102 corresponding to one or more items offered for acquisition by the merchant that are also offered for acquisition via the service provider 102. In a particular implementation, the communication from the merchant may include a counterproposal that includes suggestions to modify the terms of the initial proposal by the service provider 102. In one implementation, the counterproposal may include a modified price of an item, modified terms of a deal (e.g. discount associated with the deal), one or more different items for the merchant to receive services from the service provider 102, or a combination thereof. The service provider 102 may accept the counterproposal of the merchant or send additional modifications to the proposal to the merchant.

In the illustrative implementation of FIG. 2, the computer-readable media 210 includes a merchant services system 224 to provide services to merchants regarding particular items offered for acquisition by the merchants. In particular, the merchant services system 224 includes a deals module 226 that administers deals for merchants. In one implementation, the deals module 226 may administer a deal associated with an item that is offered for acquisition by both the merchant and the service provider 102. In some cases, the deal may have originally been administered by the merchant and provided via a site of the merchant. In other cases, the deal may have originally been administered by a deal sourcer on behalf of the merchant. The deal sourcer may provide deals on behalf of a number of merchants, such as via a site of the deal sourcer. In additional cases, the deal may have been proposed by the service provider 102. In these instances, the service provider 102 may provide the original terms of the deal or the service provider 102 may suggest alternative terms of an existing deal for the merchant.

In a particular implementation, the deals module 226 may administer the deal by providing information about the deal via a site of the service provider 102. In one scenario, the site may be a deals site of the service provider 102 that includes deals associated with a number of merchants. In another situation, the site may be an ecommerce site of the service provider 102. In a further implementation, the site may include information about merchants located in a specific geographic region, such as a particular city or metropolitan area.

In a particular implementation, the deals module 226 may conduct transactions for users to acquire deals of a merchant. For example, the deals module 226 may receive requests from users to acquire deals of the merchant and initiate communications with one or more financial institutions to obtain funds so that a particular user can acquire a deal via the service provider 102. In some cases, the currency utilized to acquire a deal may be a virtual currency. To illustrate, the service provider 102 may provide a virtual currency that users can submit to acquire items and/or deals via the service provider 102. The deals module 226 may also execute operations directed to the redemption of deals, such as providing vouchers including one or more identifiers in association with deals acquired via the service provider 102 and verifying the identifiers during the redemption of deals by users.

The merchant services system 224 may also store an acquisition and fulfillment module 228 that conducts operations related to the acquisition of items of merchants being offered via the service provider 102. In one implementation, the acquisition and fulfillment module 228 may facilitate transactions via a site of the service provider 102 and/or a site of the merchant 104 for users to acquire units of items offered on behalf of the merchant 104 via the service provider 102. The acquisition and fulfillment module 228 may also facilitate the fulfillment of the acquisition of items offered via the service provider 102. In some cases, the service provider 102 may offer a number of fulfillment options, such as an in-store pickup option, an overnight delivery option, a two-day delivery option, a standard delivery option, or a combination thereof. In an implementation, the acquisition and fulfillment module 228 may communicate with the merchant 104 to indicate that an item offered on behalf of the merchant 104 has been acquired via the service provider 102. For example, the acquisition and fulfillment module 228 may provide a voucher to a user that has acquired a unit of an item from the merchant 104. The voucher may include a first identifier corresponding to the user and a second identifier corresponding to the item acquired. The acquisition and fulfillment module 228 may also send a communication to the merchant 104 indicating that the user has requested to acquire a unit of the item. In some cases, the communication may include a copy of the voucher so that the merchant 104 can verify the acquisition of the item when the user picks up the item from a location of the merchant 104.

In some cases, the extent of the involvement of the service provider 102 in the acquisition and fulfillment of items via the service provider 102 may depend, at least in part, on the services acquired by the merchant 104 from the service provider 102. In one example, the service provider 102 may provide a page on a site of the service provider 102 indicating that the merchant 104 offers a unit of a particular item for acquisition and that also includes a link to redirect a user to a site of the merchant 104 or an ecommerce site where the user can initiate a transaction to acquire a unit of the item. In another example, the service provider 102 may provide a page of a site of the service provider 102 that includes information about an item offered for acquisition by the merchant 104 and that includes options selectable to initiate a transaction to acquire a unit of the item.

Additionally, the merchant services system 224 may store an item search module 230 that receives search requests to identify items offered for acquisition via the service provider 102 that match one or more criteria. In some cases, the search requests may include one or more keywords. In response to receiving a search request, the item search module 230 may analyze information associated with items included in the catalog of items 110 to identify particular items that match the one or more criteria of the search request. The item search module 230 may then provide a response to the search request that includes information associated with at least a portion of the search results.

In some cases, the search results returned by the item search module 230 may depend on the services obtained by merchants in relation to items being offered for the merchants via the service provider 102. In some cases, the item search module 230 may consider whether or not a merchant offering a particular item that is associated with the keywords of the search request has acquired enhanced search results services from the service provider 102 in determining the items to include in the search results, the order in which the search results are presented, or both. For example, the merchant 104 may acquire enhanced search results services from the service provider 102 in conjunction with an item offered by the merchant 104 that is included in the catalog of items 110. The enhanced search results services offered by the service provider 102 may cause the item of the merchant 104 to appear in search results more often in association with acquiring units of the item than merchants that have not acquired the enhanced search results services. In one example, the merchant 104 may be emphasized with respect to other merchants included in the search results. To illustrate, the merchant 104 may be placed at or near the top of the list of search results with respect to a search for a particular item, such as the item 128. In another illustration, the merchant 104 may be designated on a search results page as a sponsored result. In another example, the item search module 230 may calculate scores for merchants and/or items to determine whether or not to include a particular merchant in search results for a given search request. In this instance, a merchant may have an enhanced score due to the merchant acquiring enhanced search results services from the service provider 102.

In other scenarios, higher scores for merchants may be generated by the item search module 230 for additional reasons. For example, item search module 230 may generate a higher score for the merchant 104 at least partly in response to the merchant 104 providing additional information about items offered for acquisition by the merchant 104 that are the same as items in the catalog of items 110. To illustrate, the merchant 104 may provide information about the item 128 that is not included in the information about the item 128 in the catalog of items 110, such as one or more reviews, one or more ratings, an expanded description, combinations thereof, and so forth.

The user device 108 includes a processor 232, computer-readable media 234, and a display 236. The computer-readable media 234 is an example of computer readable storage media and may include volatile memory, nonvolatile memory, removable memory, non-removable memory, or a combination thereof. For example, the computer-readable media 234 may include, but is not limited to, RAM, ROM, EEPROM, flash memory, one or more hard disks, solid state drives, optical memory (e.g. CD, DVD), or other non-transient memory technologies. The computer-readable media 234 may also include one or more content viewing applications that are executable by the processor 232 to view electronic content provided by a number of sources. In some cases, the content viewing applications may include a browser application that may be executable to view pages of sites provided by electronic content sources. In addition, the computer-readable media 234 may store a number of applications including computer-readable instructions executable by the processor 232 to acquire items from the service provider 202. The user device 108 may also include one or more input/output devices (not shown), such as an additional display, a touchpad, a touch screen, a pointer device, speakers, microphones, keyboard, image capture devices (e.g. camera, scanner), and the like.

The merchant device 204 includes a processor 238, computer-readable media 240, and a display 242. The computer-readable media 240 is an example of computer readable storage media and may include volatile memory, nonvolatile memory, removable memory, non-removable memory, or a combination thereof. For example, the computer-readable media 240 may include, but is not limited to, RAM, ROM, EEPROM, flash memory, one or more hard disks, solid state drives, optical memory (e.g. CD, DVD), or other non-transient memory technologies. The computer-readable media 240 may also include one or more content viewing applications that are executable by the processor 238 to view electronic content provided by a number of sources. In some cases, the content viewing applications may include a browser application that may be executable to view pages of sites provided by electronic content sources. In addition, the computer-readable media 240 may store a number of applications including computer-readable instructions executable by the processor 238 to communicate with the service provider 102 regarding the acquisition of services provided by the service provider 102. The merchant device 108 may also include one or more input/output devices (not shown), such as an additional display, a touchpad, a touch screen, a pointer device, speakers, microphones, keyboard, image capture devices (e.g. camera, scanner), and the like.

Example Item Matching Module

Figure 3:
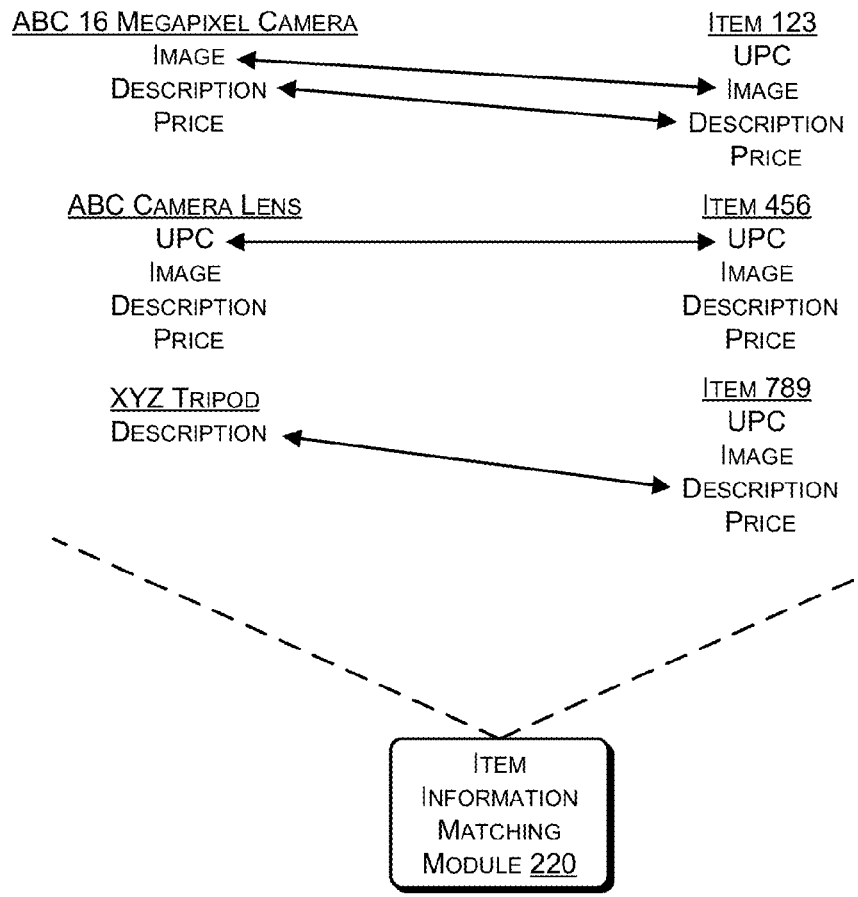
FIG. 3 illustrates an example item information matching module that determines whether a merchant and a service provider are offering units of the same item for acquisition.

FIG. 3 illustrates an example item information matching module 220 that determines whether a merchant and a service provider are offering units of the same item for acquisition. In the illustrative implementation of FIG. 3, the item information matching module 220 may obtain merchant item information 302 and item catalog information 304, such as information included in the catalog of items 110 of FIG. 1 and FIG. 2. The merchant item information 302 may have been obtained from one or more information sources as described previously with respect to FIG. 1 and FIG. 2.

As shown in FIG. 3, the merchant item information 302 may include listings for a number of items. For example, the merchant item information 302 may include information about ABC 16 Megapixel camera, such as an image of the camera, a description of the camera, and a price of the camera. Additionally, the merchant item information 302 includes information about ABC Camera Lens, such as a UPC of the lens, an image of the lens, a description of the lens, and a price of the lens. Further, the merchant item information 302 includes information about XYZ Tripod, such as a description of the tripod. The item catalog information 304 also includes information that may correspond to information included in the merchant item information 302. For example, the item catalog information 304 includes a UPC, an image, a description, and a price of Item 123, Item 456, and Item 789. In a particular scenario, the identifiers Item 123, Item 456, and Item 789 are unique identifiers assigned to the respective items by the service provider 102.

In an illustrative implementation, the item information matching module 220 may apply one or more matching rules to determine whether the items included in the merchant item information 302 are the same as any of the items included in the item catalog information 304. In one situation, the item information matching module 220 may determine whether specified information is included in both the merchant item information 302 and the item catalog information 304 for a particular item. In some cases, the item information matching module 220 may determine a match between a listing included in the merchant item information 302 and a listing included in the item catalog information 304 according to similarities between one or more combinations of specified information. The item information matching module 220 may analyze the information included in the merchant item information 302 and the item catalog information 304 until a specified combination of information between respective listings included in the merchant item information 302 and the item catalog information 304 is identified.

In one example, as shown in FIG. 3, the item information matching module 220 may determine that the ABC 16 Megapixel Camera included in the merchant item information 302 includes an image and at least a portion of the description that matches the image and description of the Item 123 included in the item catalog information 304. Thus, in one instance, the item information matching module 220 may determine that the ABC 16 Megapixel Camera of the merchant item information 302 matches the Item 123 of the item catalog information 304. In another example, the item information matching module 220 may determine that the UPC of the ABC Camera Lens of the merchant item information 302 is the same as the UPC of the Item 456 of the item catalog information 304. After determining the UPCs of the ABC Camera Lens and the Item 456 match, the item information matching module 220 may stop looking for similarities between information associated with the two items. In an additional example, the item information matching module 220 may determine that at least a portion of the description of the XYZ tripod matches a portion of the description of the Item 789. The item information matching module 220 may also determine that the item catalog information 304 does not include any additional information matching the merchant item information 302 for the XYZ tripod. In one implementation, a threshold amount of the description of the XYZ tripod of the merchant item information 302 may not match the description of the Item 789 of the item catalog information 304. Accordingly, the item matching module 220 may designate that the XYZ tripod and the Item 789 are not the same. In some cases, the item information matching module 220 may request additional information from a merchant before determining that the XYZ tripod and the Item 789 are not the same item.

Example User Interfaces

Figure 4:
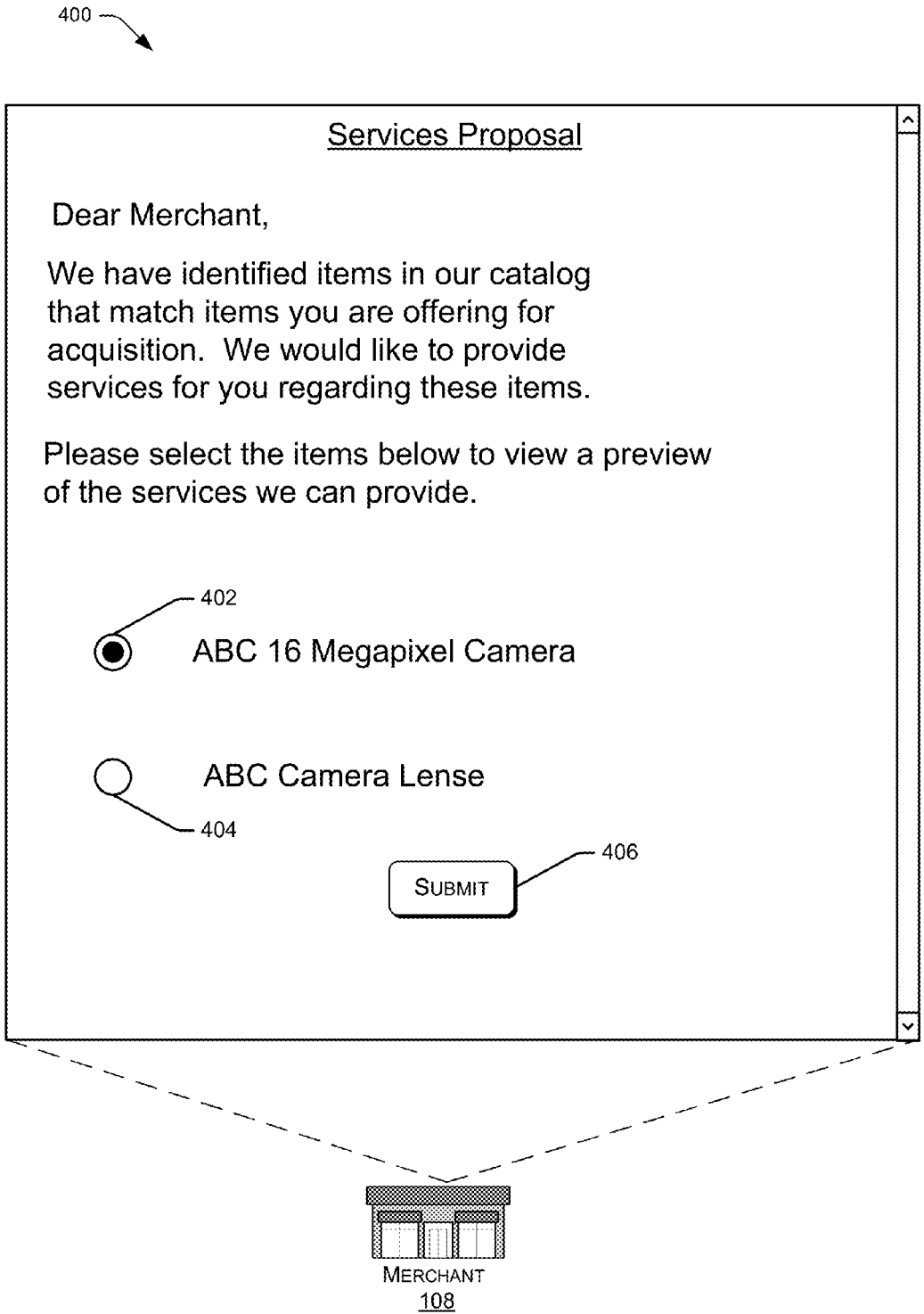
FIG. 4 is an example user interface including a proposal by a service provider to provide services to a merchant with respect to items offered for acquisition by the merchant that are the same as items offered by the service provider.

FIG. 4 is an example user interface 400 including a proposal by a service provider, such as the service provider 102, to provide services to the merchant 108 with respect to items offered for acquisition by the merchant 108 that are the same as items offered by the service provider 102 in a catalog of items. In particular, the user interface 300 indicates that the service provider 102 has identified two items, the ABC 16 Megapixel Camera and the ABC Cameral Lens, offered by the merchant 108 that match items included in a catalog of items, such as the catalog of items 110, of the service provider 102. The user interface 400 also provides an option 402 that is selectable to view a preview of the services that the service provider 102 can provide with respect to the ABC 16 Megapixel Camera. Additionally, the user interface 400 includes an option 404 that is selectable to view a preview of the services that the service provider 102 can provide with respect to the ABC Camera Lens. In the illustrative example of FIG. 4, the merchant 104 has selected to preview the services offered by the service provider 102 with respect to the ABC 16 Megapixel Camera. The request to preview these services can be submitted to the service provider 102 in response to the selection of the option 306 by the merchant 104.

Figure 5:
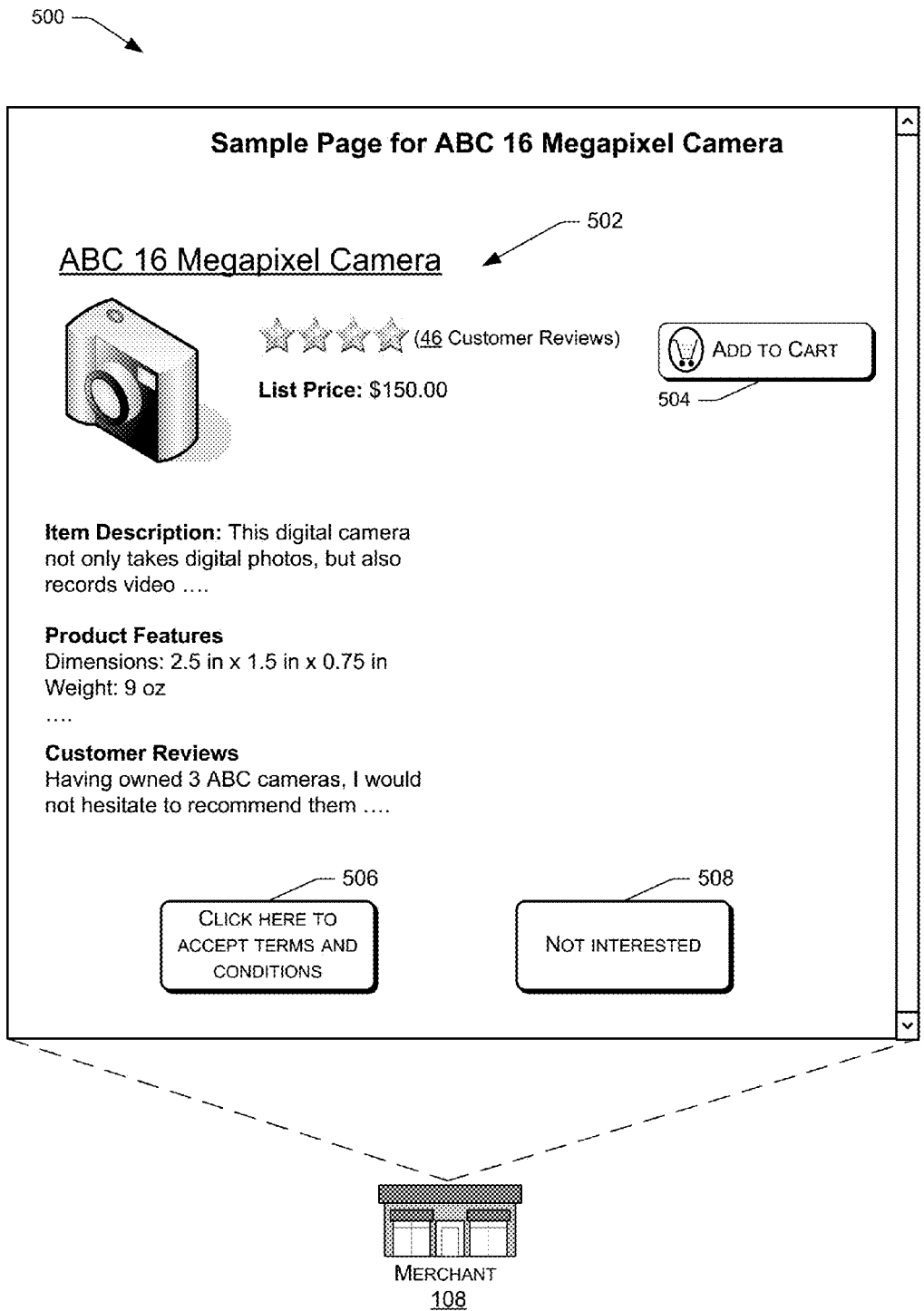
FIG. 5 is an example user interface including information about an item offered for acquisition by a merchant that may be available for acquisition via a site of a service provider.

FIG. 5 is an example user interface 500 including information about an item offered for acquisition by the merchant 108 that may be available for acquisition via a site of a service provider, such as the service provider 102. In particular, the user interface 500 may be a preview of page of a site of the service provider 102 by which users can acquire the item ABC 16 Megapixel Camera. In one implementation, the user interface 500 may be provided via an ecommerce site of the service provider 102 that is directed to users located in a particular nation or region of the world, such as a block of nations. In another implementation, the user interface 500 may be directed to users on a more local level, such as users within a particular city or metropolitan area.

In the illustrative implementation of FIG. 5, the user interface 500 includes information 502 about the ABC 16 Megapixel Camera, such as an image of the item, a rating of the item, a price of the item, a description of the item, features of the item, and reviews of the item. The user interface 500 also includes an option 504 that may be selectable by a user to initiate a transaction to acquire the item. Further, the user interface 500 includes an option 506 that is selectable by the merchant 108 to accept terms and conditions of receiving services from the service provider 102 in relation to offering the ABC 16 Megapixel Camera for acquisition by the service provider 102 on behalf of the merchant 108. In some cases, the terms and conditions may include payment to the service provider 102 in exchange for the services. The terms and conditions may also include a legal contract between the service provider 102 and the merchant 104 in relation to services provided by the service provider 102 to the merchant 104. The user interface 500 also includes an option 408 that is selectable by the merchant 104 to decline the proposal by the service provider 102.

Figure 6:
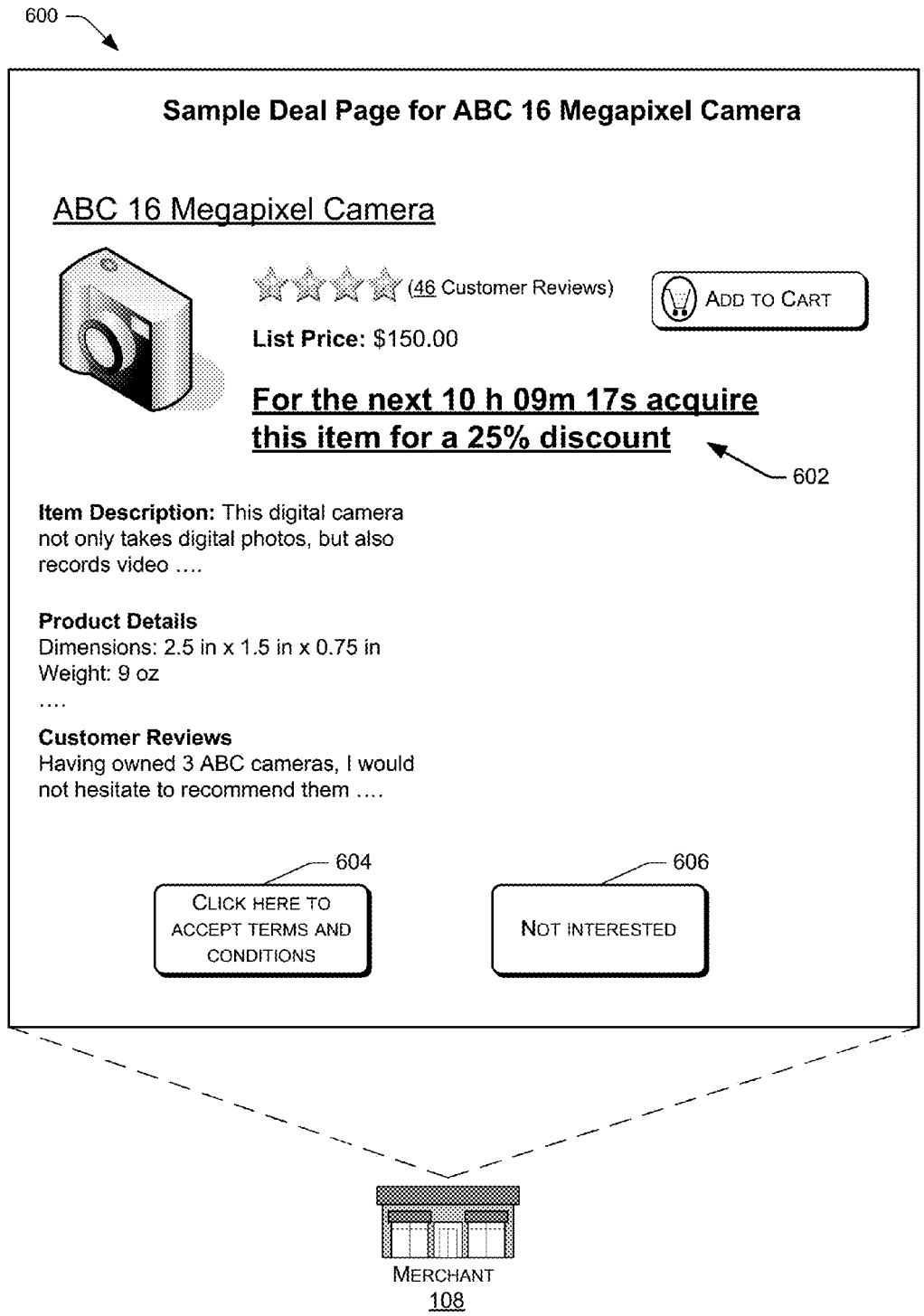
FIG. 6 is an example user interface including information about a deal associated with an item offered on behalf of a merchant that may be available for acquisition via a site of a service provider.

FIG. 6 is an example user interface 600 including information about a deal associated with an item offered for acquisition by the merchant 104 that may be available for acquisition via a site of a service provider, such as the service provider 102. In particular, the user interface 600 may be a preview of page of a site of the service provider 102 by which users can acquire a deal associated with the item ABC 16 Megapixel Camera. In addition, to the information about the ABC 16 Megapixel Camera included in the user interface 500 of FIG. 5, the user interface 600 also includes terms 602 of the deal. The terms 602 may specify a duration of the deal and a discount associated with the deal. The user interface 600 may include an option 604 that is selectable to accept the terms and conditions of the service provider 102 in association with offering a deal for the ABC 16 Megapixel Camera and an option 606 that is selectable by the merchant 104 to decline the proposal.

Figure 7:
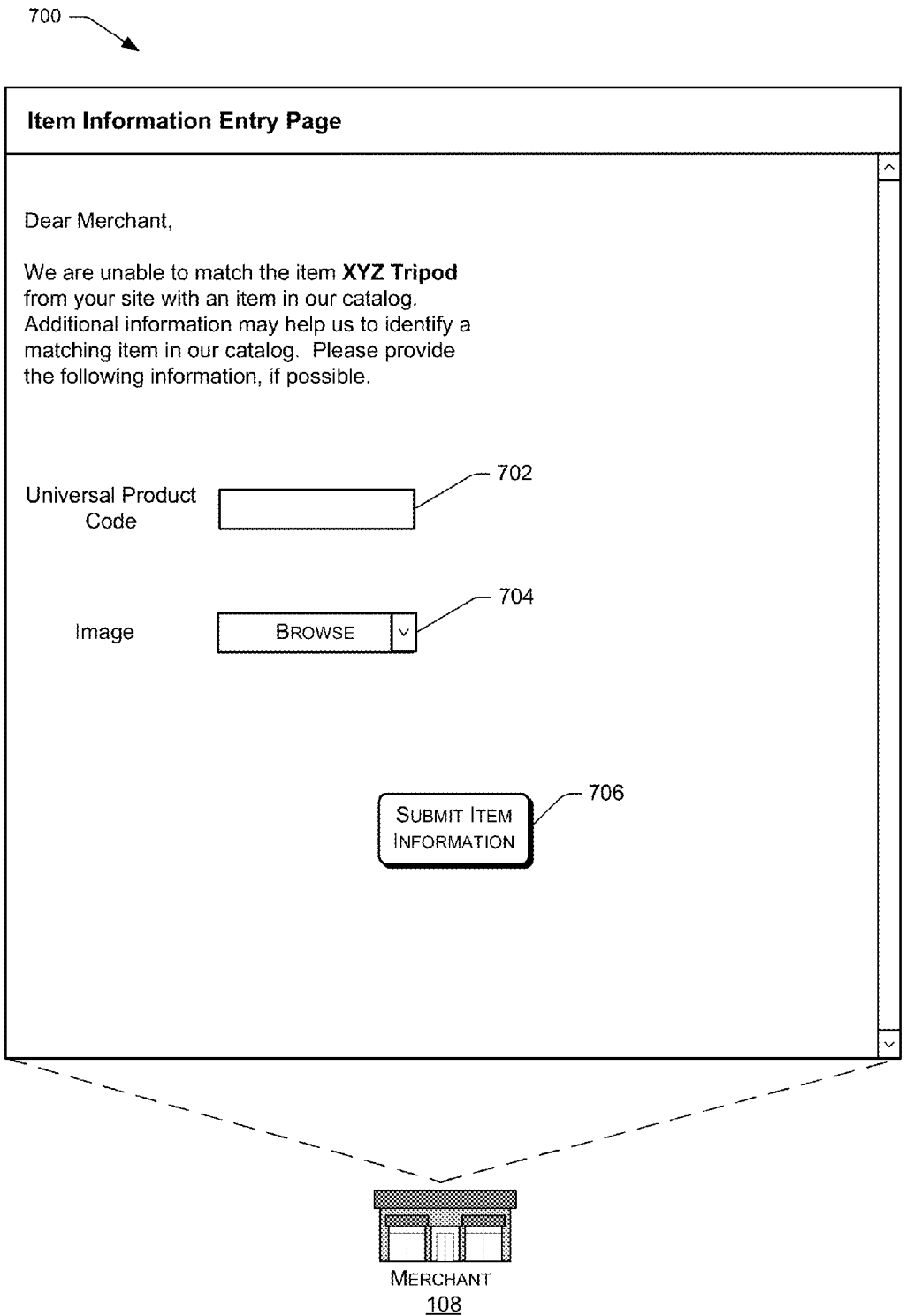
FIG. 7 is an example user interface that provides options for a merchant to enter data in association with an item offered for acquisition by the merchant to determine whether the item is the same as an item in a catalog of a service provider.

FIG. 7 is an example user interface 700 that provides options for the merchant 104 to enter data in association with an item offered for acquisition by a merchant 104 to determine whether the item is the same as an item in a catalog of a service provider, such as the service provider 102. The user interface 600 may indicate that additional information about an item, such as the XYZ tripod, offered for acquisition by the merchant 104 may be provided in an attempt to match information about the item with information about an item in a catalog of items, such as the catalog of items 110 of the service provider 102. In particular, the user interface 700 includes a text entry box 702 for entering a UPC of the item and a drop down box 704 for selecting an image of the item. The user interface 700 also includes an option 706 that is selectable to submit the information to the service provider 102.

Example Processes

Figure 8:
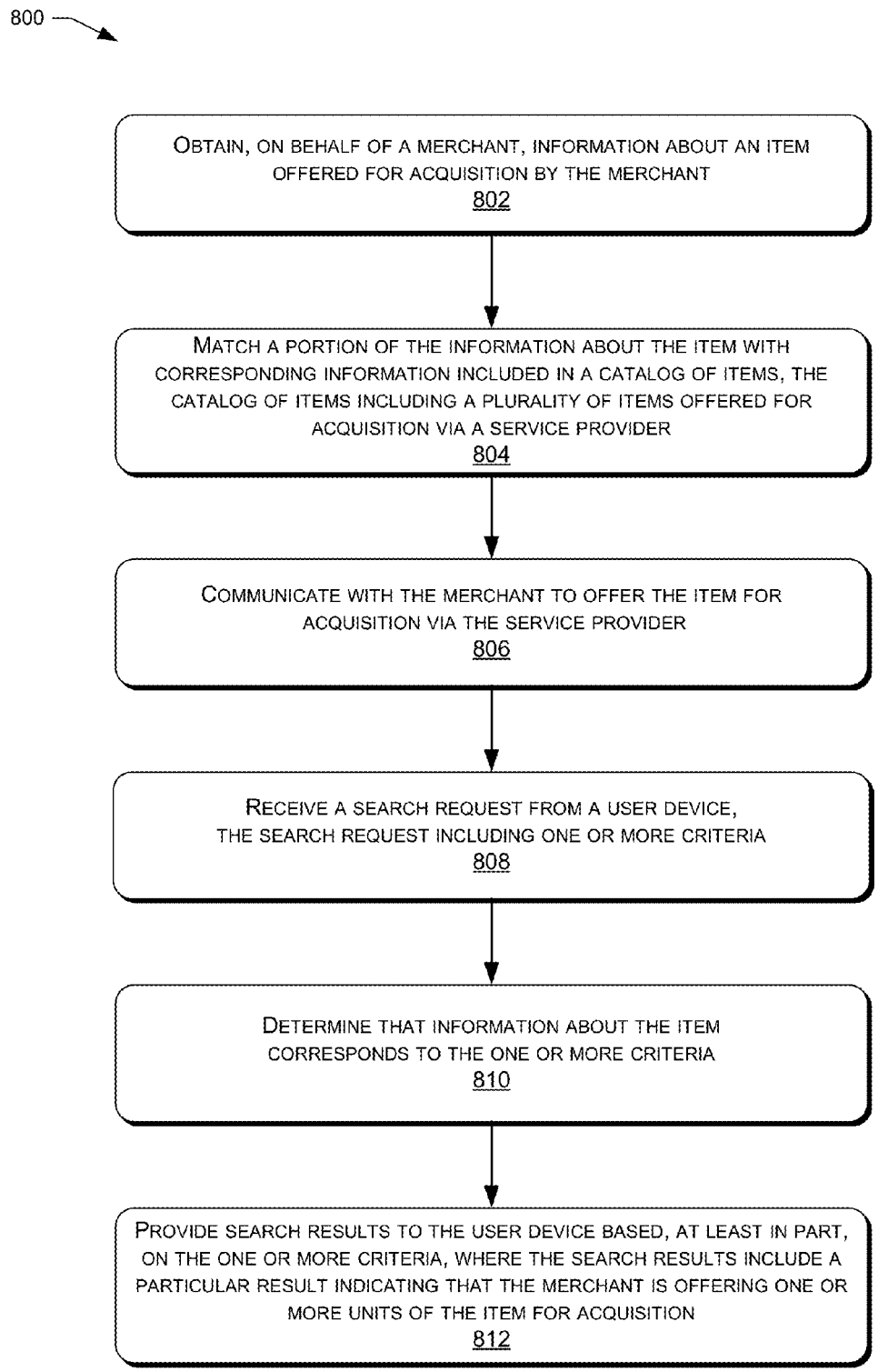
FIG. 8 is a flow diagram of an example process to identify items offered for acquisition by a merchant that are included in a catalog of items offered for acquisition by a service provider.

FIG. 8 describes various example processes of providing services to a merchant for items included in a service provider catalog. The example processes are described in the context of the environment of FIGS. 1-7 but are not limited to those environments. Each process described in this disclosure is illustrated as a logical flow graph, each operation of which represents a sequence of operations that can be implemented in hardware, software, or a combination thereof. In the context of software, the operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some embodiments the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

FIG. 8 is a flow diagram of an example process 800 to identify items offered for acquisition by a merchant that are the same as items included in a catalog of items offered for acquisition by a service provider. At 802, the process 800 includes obtaining information from one or more sources about an item offered for acquisition by a merchant. The one or more sources may include a site of the merchant, other sites including information about the merchant (e.g., ecommerce sites, merchant directory sites), physical documents including information about the merchant, or a combination thereof.

At 804, the process 800 includes matching a portion of the information about the item obtained from the one or more sources with corresponding information included in a catalog of items. The catalog of items may include a plurality of items offered for acquisition via a service provider. In a particular implementation, when a threshold amount of the information obtained about the item matches the corresponding information included in the catalog of items, the item may be designated as being the same as an item included in the catalog of items. In another implementation, the item offered for acquisition by the merchant may be designated as being the same as an item in the catalog of items when specified information about the item matches information included in the catalog of items, such as a UPC code.

At 806, the process 800 includes communicating with the merchant to offer the item for acquisition via the service provider at least partly in response to matching a portion of the information obtained about the item with corresponding information included in the catalog of items. In a particular implementation, the service provider and the merchant may exchange emails, text messages, or telephone calls about terms of the service provider offering the item for acquisition on behalf of the merchant, such as via a site of the service provider. Offering the item for acquisition via the service provider may be one of a number of services offered by the service provider for the item. For example, the service provider may also provide a deal in association with the item, enhanced search results services with respect to the item, or both.

Additionally, at 808, the process 800 includes receiving a search request from a user device. The search request may include one or more criteria, such as one or more keywords. At 810, the process 800 includes determining that information about the item corresponds to the one or more criteria. Further, at 812, the process 800 includes providing search results to the user device based, at least in part, on the one or more criteria. The search results may include a particular result that indicates that the merchant is offering one or more units of the item for acquisition. In some cases, the search results may be presented in a particular order. In one situation, the order of the search results may depend on whether any of the items included in the search results are provided by merchants obtaining enhanced search results services from the service provider. In a particular implementation, the merchant offering the item for acquisition may obtain enhanced search results services from the service provider. In this situation, the merchant may be emphasized with respect to other search results, such as being placed at the top of the list of search results.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
   memory;
   one or more processors; and
   computer-executable instructions maintained in the memory and executable by the one or more processors to:
     obtain first information from scanned documents;
     perform an optical character recognition process on the first information to produce second information;
     analyze the second information with respect to a first matching rule of a plurality of matching rules, the first matching rule specifying matching between first identifiers of first items offered for acquisition by merchants and second identifiers of second items included in a catalog of a service provider;
     determine that the second information does not include identifiers of items;
     analyze the second information with respect to a second matching rule of the plurality of matching rules, the second matching rule specifying matching between a combination of:
       first images of the first items and second images of the second items, and
       first descriptions of the first items and second descriptions of the second items;
     determine that a merchant and the service provider offer units of an item for acquisition based at least partly on:
       determining that a threshold amount of a first image of the item included in the second information corresponds with a second image included in the catalog of the service provider; and
       determining that an additional threshold amount of a first description of the item included in the second information corresponds with a second description included in the catalog of the service provider;
     send, from the service provider, a first communication to a computing device of the merchant to offer the item for acquisition via the service provider; and
     receive a second communication from the computing device specifying that the item is to be offered for acquisition by the service provider.

2. The system as recited in claim 1, further comprising computer-executable instructions maintained in the memory and executable by the one or more processors to:
   receive a request from an additional computing device of a user to acquire a unit of the item;
   provide a voucher to the additional computing device, wherein the voucher includes an identifier corresponding to the user and an additional identifier corresponding to the unit of the item; and
   send an additional communication to the additional computing device indicating that the user has requested to acquire the unit of the item, the additional communication including the identifier and the additional identifier.

3. The system as recited in claim 1, further comprising computer-executable instructions maintained in the memory and executable by the one or more processors to scrape one or more sites related to the merchant by analyzing code of one or more pages of a site of the one or more sites to at least partially obtain information about a plurality of items offered for acquisition by the merchant.

4. The system as recited in claim 1, wherein the identifiers of the items include universal product codes (UPCs) of the items.

5. One or more non-transitory computer-readable media having computer-executable instructions that, when executed by one or more processors, cause the one or more processors to perform operations comprising:
   obtaining first information from scanned documents;
   performing an optical character recognition process on the first information to produce second information;
   analyzing the second information with respect to a first matching rule of a plurality of matching rules, the first matching rule specifying matching between first identifiers of first items offered for acquisition by merchants and second identifiers of second items included in a catalog of a service provider;
   determining that the second information does not include identifiers of items;
   analyzing the second information with respect to a second matching rule of the plurality of matching rules, the second matching rule specifying matching between a combination of:
     first images of the first items and second images of the second items, and
     first descriptions of the first items and second descriptions of the second items;
   determining that a merchant and the service provider offer units of an item for acquisition based at least partly on:
     determining that a threshold amount of a first image of the item included in the second information corresponds with a second image included in the catalog of the service provider; and
     determining that an additional threshold amount of a first description of the item included in the second information corresponds with a second description included in the catalog of the service provider;
   sending, from the service provider, a first communication to a computing device of the merchant to offer the item for acquisition via the service provider; and
   receiving a second communication from the computing device specifying that the item is to be offered for acquisition by the service provider.

6. The one or more computer-readable media as recited in claim 5, wherein the operations further comprise:
   receiving a request from an additional computing device of a user to acquire a unit of the item;
   providing a voucher to the additional computing device, wherein the voucher includes an identifier corresponding to the user and an additional identifier corresponding to the unit of the item; and
   sending an additional communication to the additional computing device indicating that the user has requested to acquire the unit of the item, the additional communication including the identifier and the additional identifier.

7. The one or more computer-readable media as recited in claim 5, wherein the operations further comprise scraping one or more sites related to the merchant by analyzing code of one or more pages of a site of the one or more sites to at least partially obtain information about a plurality of items offered for acquisition by the merchant.

8. The one or more computer-readable media as recited in claim 5, wherein the identifiers of the items include universal product codes (UPCs) of the items.

* * * * *